(12) United States Patent
Ohta et al.

(10) Patent No.: US 6,546,129 B1
(45) Date of Patent: *Apr. 8, 2003

(54) IMAGE PROCESSING APPARATUS, METHOD, AND MEDIUM FOR ADDING IDENTIFICATION INFORMATION

(75) Inventors: Takatoshi Ohta, Yokohama (JP); Ryuichi Arai, Tokyo (JP); Munehiko Ohta, Kawasaki (JP); Hiroaki Sugiura, Kawasaki (JP); Toshihiro Nakazawa, Kurume (JP); Takeshi Yamazaki, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,984

(22) Filed: Nov. 4, 1997

(30) Foreign Application Priority Data

Nov. 15, 1996 (JP) .............................................. 8-304708

(51) Int. Cl.⁷ .......................... G06K 9/00; G03G 21/00; G09C 3/08
(52) U.S. Cl. .......................... 382/162; 399/366; 380/51
(58) Field of Search ................................. 382/162, 167, 382/112; 358/501, 401, 296; 399/366, 365; 380/3, 4, 23, 24, 51, 54, 55

(56) References Cited

U.S. PATENT DOCUMENTS

| | | | | |
|---|---|---|---|---|
| 5,123,063 A | * | 6/1992 | Ohkubo | 382/318 |
| 5,291,243 A | * | 3/1994 | Heckman et al. | 380/55 |
| 5,390,003 A | | 2/1995 | Yamaguchi et al. | 399/366 |
| 5,524,933 A | | 6/1996 | Kunt et al. | 283/67 |
| 5,568,550 A | * | 10/1996 | Ur | 380/3 |
| 5,606,609 A | * | 2/1997 | Houser et al. | 382/306 |
| 5,661,574 A | * | 8/1997 | Kawana | 358/501 |
| 5,668,636 A | * | 9/1997 | Beach et al. | 358/296 |
| 5,798,844 A | * | 8/1998 | Sakano et al. | 358/405 |

FOREIGN PATENT DOCUMENTS

| | | | | |
|---|---|---|---|---|
| EP | 0635969 | 1/1995 | | H04N/1/44 |
| EP | 0637165 | 2/1995 | | H04N/1/00 |
| EP | 0654934 | 5/1995 | | H04N/1/00 |
| JP | 02202161 | 8/1990 | | |
| WO | WO 93/25038 | 12/1993 | | G04N/1/00 |
| WO | WO 95/31794 | 11/1995 | | G06T/11/00 |

* cited by examiner

Primary Examiner—Wenpeng Chen
(74) Attorney, Agent, or Firm—Fitzpatrick, Cella, Harper & Scinto (57) ABSTRACT

In case of managing image data among plural image processing apparatuses, an object of the present invention is to suppress or restrain, as much as possible, that the image data is illegally or unfairly used. In order to achieve the object, e.g., it is provided an image processing apparatus which is connected to an external apparatus being an output destination of the image data, the image processing apparatus comprises an input means for inputting the image data representing an image, an addition means for adding additional information capable of specifying the external apparatus to the image data inputted by the input means, in a state that the additional information is difficult to be perceived by human eyes, and an output means for outputting the image data to which the additional information was added by the addition means, to the external apparatus.

29 Claims, 9 Drawing Sheets

IMAGE PROCESSING APPARATUS, METHOD, AND MEDIUM FOR ADDING IDENTIFICATION INFORMATION

BACKGROUND OF THE INVENTION

1. Field of the Invention

The present invention relates to an image processing apparatus and method which can add various information to an image, and to a storage medium which stores such a method.

2. Related Background Art

Conventionally, various techniques have been developed to suppress that a negotiable paper such as a bank note or the like is forged by using a single-body image copy machine such as a color copy machine or the like to be unfairly used.

For example, in one technique, additional information (e.g., machine number of copy machine) is added to an image which is copied and produced by a color copy machine, in a state that the additional information is difficult for human eyes to perceive. That is, since the additional information is patternized and then added to only a yellow component of the color image to be copied and produced, the information becomes difficult for human eyes to perceive.

Thus, when the illegally or unfairly formed image is found, it is possible to detect which copy machine (i.e., image formation unit) was used to copy the image, by analyzing the additional information added to the image.

On the other hand, in addition to the problem of negotiable paper, there is some fear that a copyright, a likeness right, a trademark right or the like is infringed or trespassed even on an image such as a picture, a photograph, a video, an animation character or the like. In such a case, the above technique is also effective.

Further, in recent years, functions of a computer system and peripheral apparatuses for inputting and outputting image data, such as a scanner, a printer and the like have improved year by year. Therefore, in a case where image forming is performed by using such plural image processing apparatuses, the high-quality image such as the negotiable paper or the like can be formed.

Furthermore, since network technique such as an internet or the like has progressed, the image data can be transferred from one image processing apparatus to another distant image processing apparatus.

Under these circumstances, in order to prevent such illegal actions, it is insufficient that the image processing apparatus for adding the additional information only adds the additional information to specify or identify this image processing apparatus itself. This is because the plural image processing apparatuses which participated in the illegal actions can not be specified or identified only by the additional information.

Furthermore, the information for specifying the apparatus itself, such as the machine number, a type number or the like, has been conventionally used as the above additional information.

SUMMARY OF THE INVENTION

The present invention is made in consideration of the above-described related background art, and an object of thereof is to suppress or restrain, in case of managing image data among plural image processing apparatuses, that such the image data is illegally or unfairly used, as much as possible.

In other words, another object of the present invention is to add, in addition to conventional additional information, further-effective additional information to an input image in a state that the additional information is difficult for human eyes to perceive.

Concretely, the object of the present invention is to process, in case of outputting the image data representing an image to an external apparatus, such the image data not to be used illegally or unfairly.

In order to achieve the above object, according to one preferred embodiment of the present invention, it is provided an image processing apparatus which is connected to the external apparatus being an output destination of the image data, the image processing apparatus comprising:

an input means for inputting the image data representing the image;

an addition means for adding the additional information capable of specifying or identifying the external apparatus to the image data inputted by the input means, in a state that the additional information is difficult to be perceived by the human eyes; and an output means for outputting the image data to which the additional information was added by the addition means, to the external apparatus.

Another object of the present invention is to process, in case of inputting the image data from an image pickup apparatus capable of generating the image data by reading the image, such the image data not to be used illegally or unfairly.

In order to achieve the above object, according to one preferred embodiment of the present invention, it is provided an image processing apparatus which is connected to the image pickup apparatus for generating the image data by reading the image, the image processing apparatus comprising:

an input means for inputting the image data from the image pickup apparatus;

an addition means for adding the additional information capable of specifying or identifying the image pickup apparatus to the image data inputted by the input means, in the state that the additional information is difficult to be perceived by the human eyes; and an output means for outputting the image data to which the additional information was added by the addition means.

A further another object of the present invention is to suppress or restrain the illegal use of the image data by not adding such information specifying the apparatus itself as in the related background art but adding another additional information.

In order to achieve the above object, according to one preferred embodiment of the present invention, it is provided an image processing apparatus which operates by using a predetermined software, the apparatus comprising:

an input means for inputting the image data representing the image;

an addition means for adding the additional information capable of specifying or identifying the predetermined software to the image data inputted by the input means, in the state that the additional information is difficult to be perceived by the human eyes; and an output means for outputting the image data to which the additional information was added by the addition means.

A further another object of the present invention is to further suppress or restrain the illegal use of the image data by not adding such the information specifying the apparatus itself as in the related background art but adding another additional information.

In order to achieve the above object, according to one preferred embodiment of the present invention, it is provided an image processing apparatus which is connected to the external apparatus, the image processing apparatus comprising:

an input means for inputting the image data;

a color process means for performing a color process on the image data inputted by the input means, in a method suitable for the external apparatus;

an addition means for adding a code specifying or identifying the method of the color process to the image data, in a state that the code is difficult to be perceived by the human eyes; and an output means for outputting the image data to which the code was added by the addition means.

The above and other objects, features, and advantages of the present invention will be apparent from the detailed description and the appended claims in conjunction with the accompanying drawings.

DETAILED DESCRIPTION OF THE PREFERRED EMBODIMENT

Figure 1:
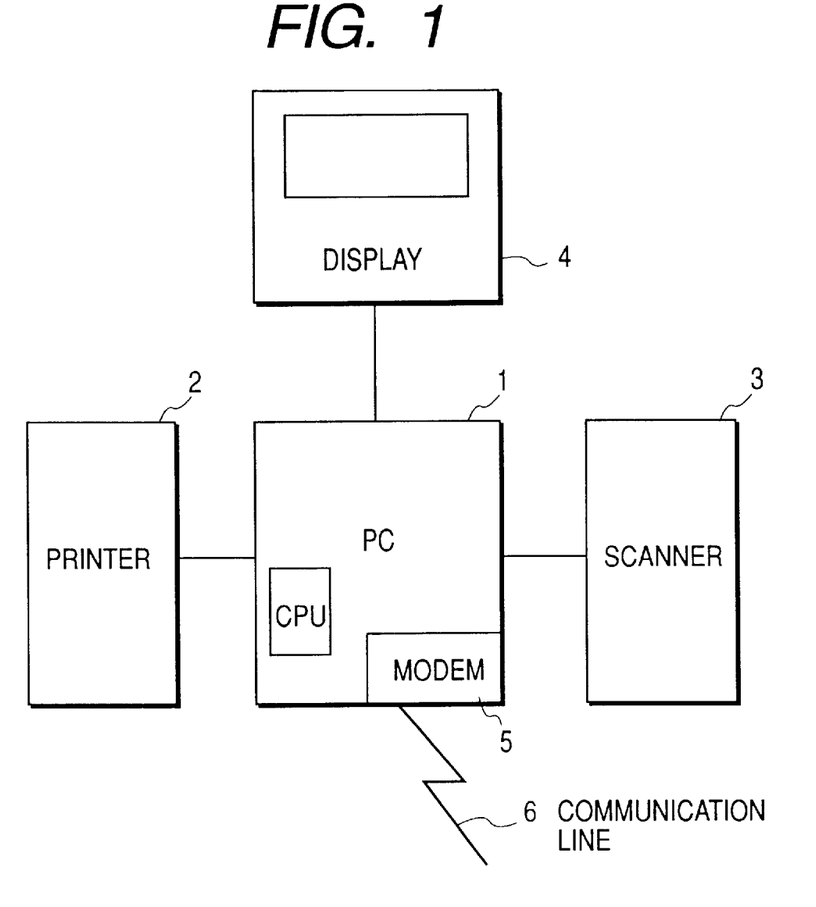
FIG. 1 is a block diagram showing an entire image process system used in a present embodiment.
Figure 2:
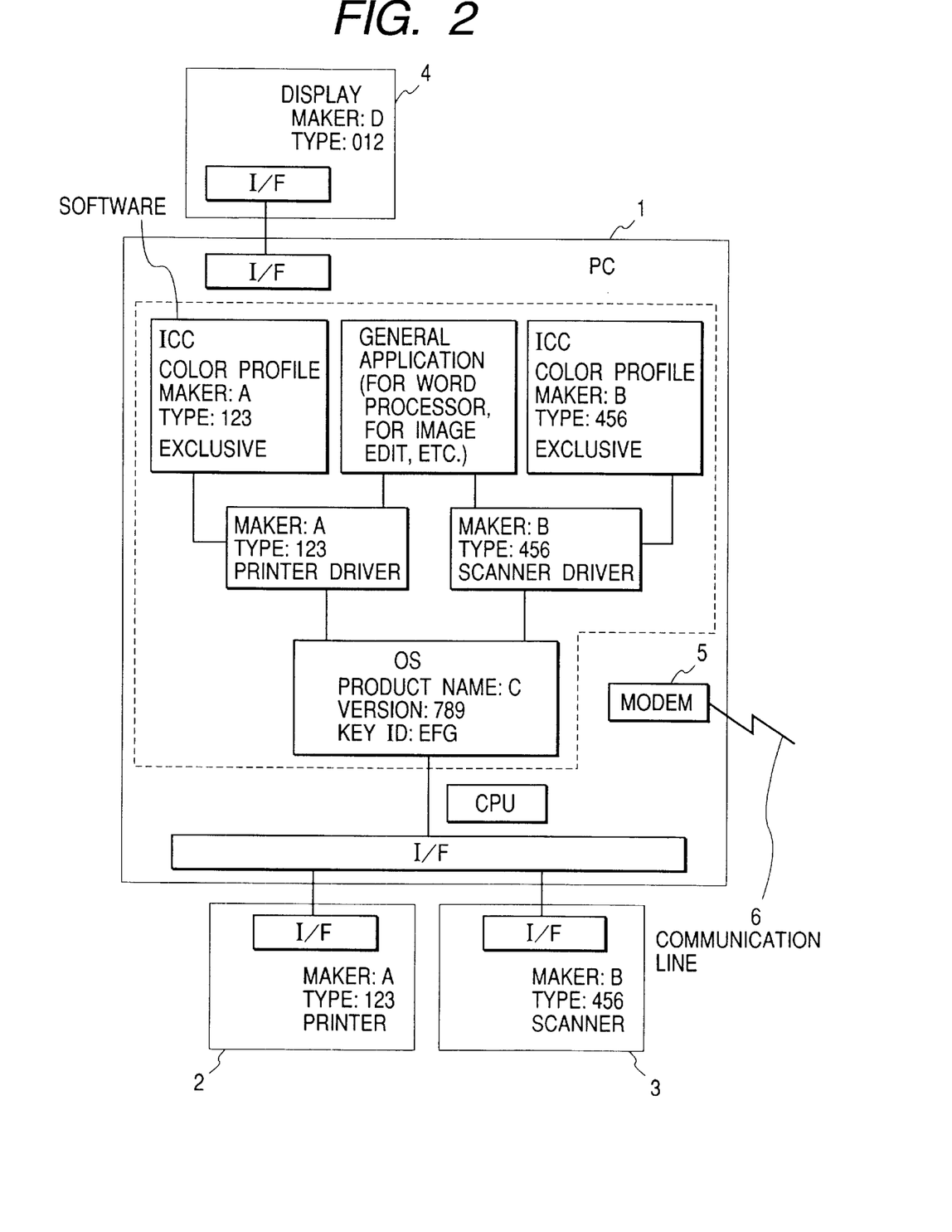
FIG. 2 is a detailed block diagram for explaining structure of FIG. 1.

FIG. 1 is a block diagram showing an entire image process system which is used in the present embodiment.

In FIG. 1, reference numeral 1 denotes a personal computer. Reference numeral 2 denotes a color printer which outputs image data image-processed by the personal computer 1, as a visible image. Reference numeral 3 denotes a color scanner which reads R (red), G (green) and B (blue) components of an original image and then outputs color image data to the personal computer 1. Reference numeral 4 denotes a display which displays the image data image-processed by the personal computer 1, as the visible image. Reference numeral 5 denotes a modem which is provided within the personal computer 1. The modem 5 can output the image data image-processed by the personal computer 1 to be a communication line 6 to transmit it to another external apparatus connected on the communication line 6. Further, the modem 5 can receive image data from another external apparatus, and output the received image data to the display 4 or the printer 2 to output it visibly.

The above external apparatus may be the image process system shown in FIG. 1, or may be a mere network printer, a network scanner, a network display or the like.

The personal computer 1 has a RAM (random-access memory) for storing therein various softwares, and a CPU (central processing unit) for actually initializing the software to perform controlling of the entire personal computer 1, including controlling of the image process.

It should be noted that the printer 2, the scanner 3 and the display 4 have been respectively registered as devices in an OS (operating system) installed in the personal computer 1. Further, as shown in FIG. 1, it is assumed that the printer 2, the scanner 3 and the display 4 are connected to the personal computer 1 through connection lines capable of managing the image data and a control command.

All of the personal computer 1, the printer 2, the scanner 3 and the display 4 are currently in a power-on state and in a job-waiting state.

Hereinafter, it will be explained a series of process, i.e., (1) the image data is input from the scanner 3, (2) the input image data is edited by using the personal computer 1 and the display 4, and (3) the edited image data is outputted as the image by the printer 2.

(1) Image Data Input

A user initializes an commercially available image handling application software which has been installed. Thus, the scanner 3 is operated through a scanner driver/OS, and the image data generated by reading the original with the scanner 3 is inputted to the personal computer 3.

In case of operating the scanner 3, the scanner driver confirms whether or not the device (i.e., scanner 3 (maker: B, type: 456) in this case) connected to the personal computer 1 corresponds to the scanner driver, by performing negotiation between the personal computer 1 and the scanner 3 through an interface cable (e.g., IEEE 1284 standard) connecting the personal computer 1 and the scanner 3 to each other. Concretely, the scanner driver confirms whether or not maker name, device name, type and the like stored in a color profile included in the scanner driver respectively correspond to maker name, device name, type and the like of the device (i.e., scanner 3) obtained by the negotiation.

If the confirmation results "no correspondence", it is confirmed that a color characteristic (i.e., correction parameter) corresponding to the color profile is different from a color characteristic of the scanner 3, whereby color matching can not be realized by color correcting (described later). Therefore, the scanner driver gives the user warning by indicating such a fact, through a GUI of the driver.

The user selects change or no change of the scanner driver on the basis of this warning displayed on the display 4.

When changing the scanner driver, it is performed a process for again confirming the device name and the like of the changed driver and the device name and the like obtained by the negotiation.

When not changing the scanner driver irrespective of no correspondence between the scanner driver and the scanner 3, the scanner driver generates information representing "no correspondence between scanner driver and scanner". This information is used in an add-on process (described later).

On the other hand, if the confirmation results "correspondence", the scanner driver does not give such the warning and continues the operation.

Then, the scanner driver converts the image data generated by reading the original, into the image data of file format such as TIFF, Flash-Pix or the like, embeds an ICC-standard color profile corresponding to the scanner 3, and stores the color profile in a storage means such as a hard disk or the like in the personal computer 1.

(2) Image Data Edit

Subsequently, the user initiates an image edit application software, calls the file formed in the above process (1) from the application, and causes the display 4 to display the image.

At this time, the color correction process is performed by using the embeded ICC-standard color profile corresponding to the scanner 3 as a source profile and the embeded ICC-standard color profile corresponding to the display 4 as a destination profile, to perform matching between a color of the original and a color of the displayed image.

Then, on the basis of the displayed image, the user performs the edit to write a message into the image represented by the image data in the file, lay out plural duplicated images in one file, and the like, so as to change the image data. After then, the image data is again stored with the same file format.

(3) Image Data Output

Further, the user initiates the image edit application software used in the image process system (2), calls the edited image data in the file, outputs the called image data to the printer 2, and causes the printer 2 to visibly output an image represented by the image data.

In order to cause the printer 2 to perform the visible outputting on the basis of the image edit application software, the image data is outputted to the printer 2 through the printer driver/OS to perform the image forming, in the same manner as in the case where the image handling application software in the process (1) causes the scanner 3 to perform the image data inputting.

Also, in case of operating the printer 2, the printer driver performs the color correcting (i.e., color matching process) by using the ICC-standard color profile. When the image forming is performed by this image process system, the color correcting is performed by using the color profile of the scanner 3 (having identification number B-456 (maker: B, type: 456)) as the source profile and the color profile of the printer 2 (having identification number A-123) as the destination profile.

Further, in the same manner as in case of operating the scanner 3, when the printer 2 performs the visible outputting, it is confirmed whether or not the color profile of the printer driver corresponds (or conforms) to the maker and type of the printer 2 which is actually connected to the personal computer 1.

In addition to such the color correcting, the printer driver performs gamma correcting, color adjusting (i.e., masking process), UCR (under color removal) process, changing of resolution, binarizing process or n-value data generation process corresponding to a print device (i.e., print head such as inkjet head, thermal transfer head or the like) of the printer, and the like, so as to shift or change the color as desired by the user.

Further, in the image process system to which the present invention is applied, on the image which was formed based on the image data obtained through the binarizing process or the n-value data generation process, an additional pattern for discriminating the image is added on (i.e., add-on) in a conventional known method in the state that the pattern is difficult to be perceived by the human eyes. The representative method for an add-on process will be explained later.

Subsequently, the software process by the printer driver will be explained with reference to FIG. 5.

Figure 5:
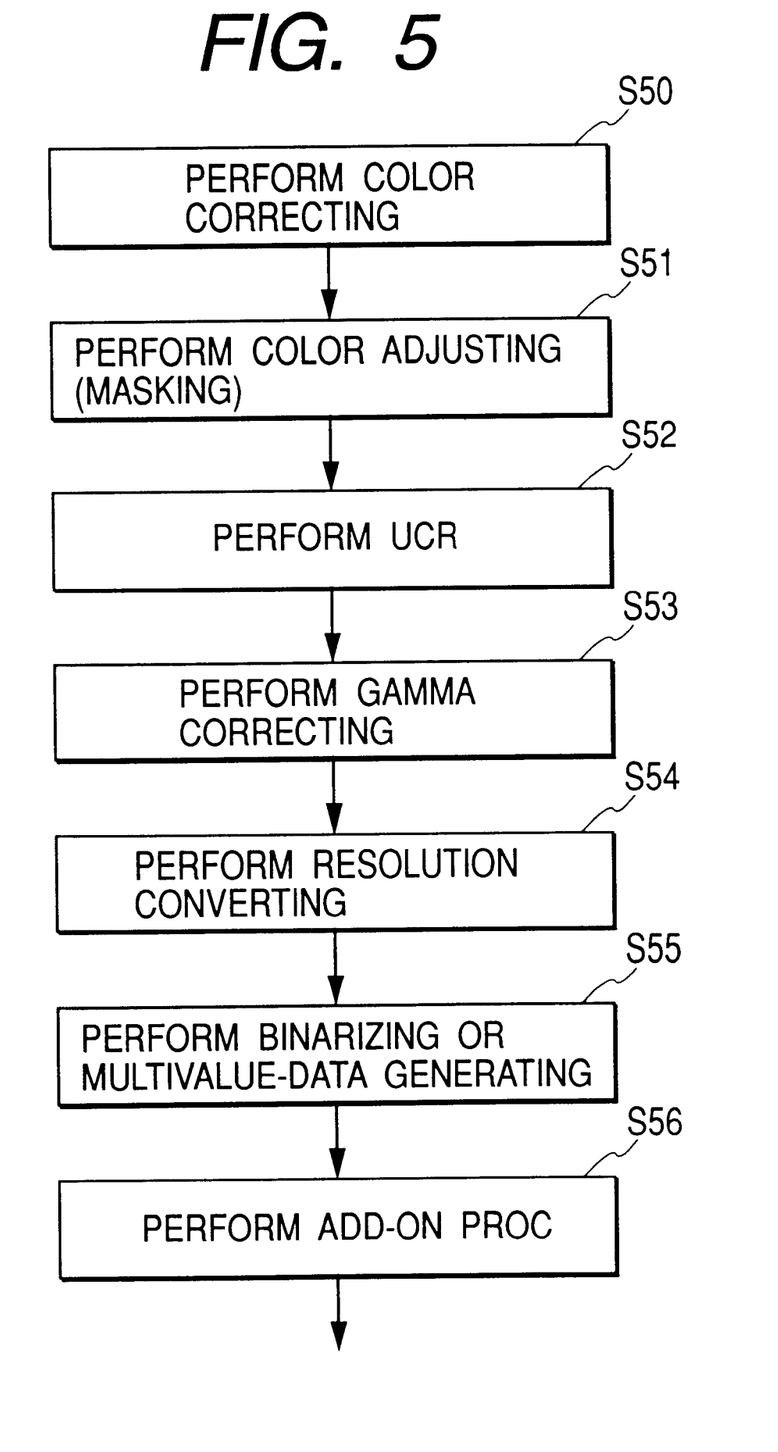
FIG. 5 is a flow chart showing a series of processes by a printer driver.

In a step S50 of FIG. 5, the color correction process (i.e., color matching process) is performed on the basis of the color profile of the scanner 3 and the color profile of the printer 2.

Subsequently, in a step S51, the color-corrected image data is subjected to the masking process. In steps S52 and S53, the obtained image data is subjected to the UCR process and then to the gamma correction process, respectively. Further, in a step S54, the resolution changing process is performed according to necessity. It should be noted that the resolution changing process in the step S54 may be performed before the processes in the steps S50 to S53 are performed.

Subsequently, in a step S55, the multivalue color image data is subjected to the binarization process or the n-value data generation process in correspondence with the function of the printer 2. After the processes in the steps S50 to S55 terminated, in a step S56, the add-on process is performed to add the additional pattern to the binary or n-value color image data.

Such the additional pattern to be added represents the maker and type of the scanner 3 which inputted the color image data to be image-formed and the maker and type of the printer 2 which actually formed the color image represented by this color image data, and is being stored in each corresponding color profile.

Further, an additional pattern which is obtained from the information representing product name, version, key ID (i.e., serial number) and the like of the OS (operating system) being initialized by the printer driver is also subjected to the add-on process. It should be noted that the version and the serial number of this OS can be easily obtained by using a system function (so-called command).

Figure 12:
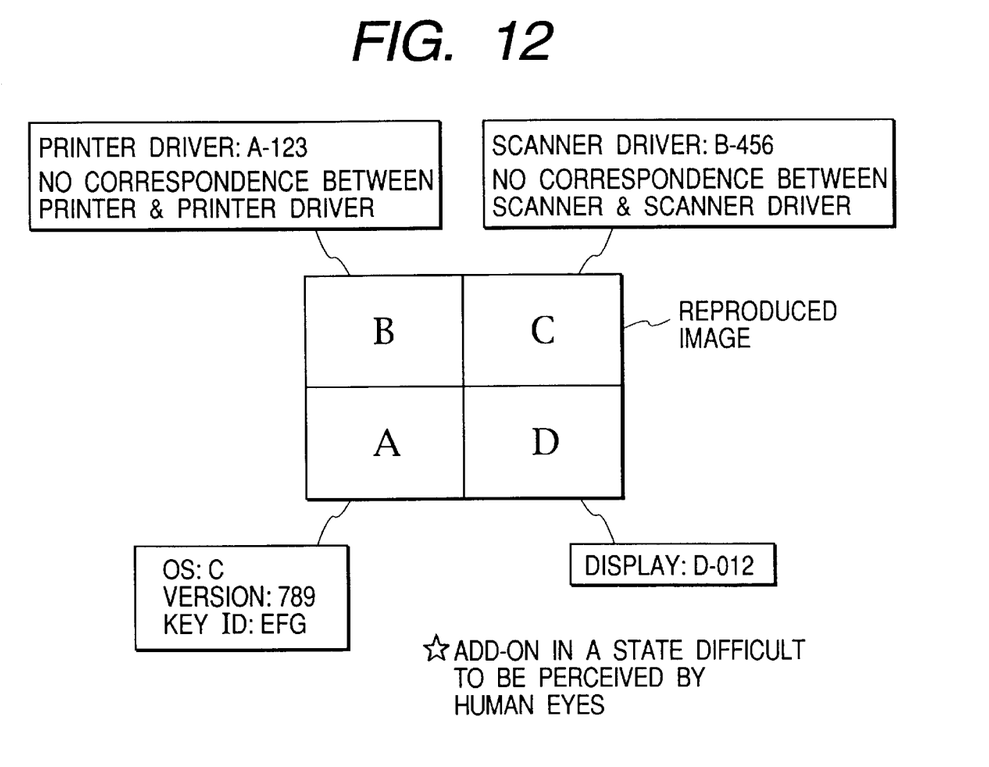
FIG. 12 is a view showing a concept of the reproduction image formed in the present embodiment.

As explained in the process (1), when not changing the scanner driver irrespective of no correspondence between the scanner driver and the scanner 3, as shown in a conceptional view of FIG. 12, the information representing "no correspondence between scanner driver and scanner" and further discrimination information of the selected scanner driver are added on. In FIG. 12, it should be noted that actually the information is being added on such that this information is difficult to be perceived by the human eyes.

In the add-on process, the information represented by the additional pattern may be added on in the state being difficult to be perceived by the human eyes, after such the information was encoded or enciphered. As a concrete add-on method, e.g., it is supposed that bit data, bar code or the like being the additional pattern is once converted into a spatial frequency component by orthogonal transformation and then added on.

A conception in case of performing the add-on process is shown in FIGS. 3 and 4A to 4C.

Figure 3:
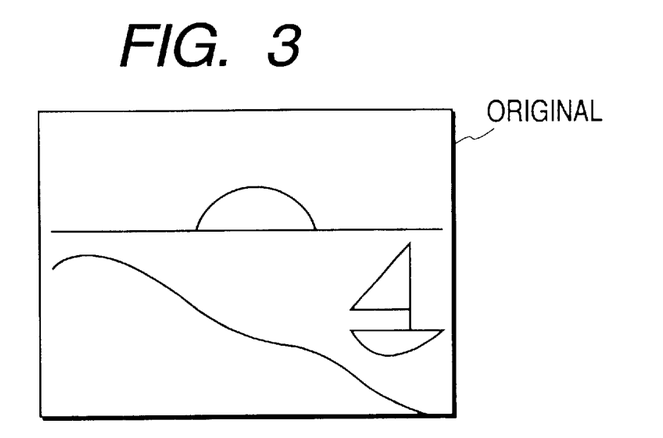
FIG. 3 is a view showing an original image which is read and input by a scanner in the present embodiment.

It is assumed that an image shown in FIG. 3 is the original, e.g., a picture which is read by the scanner 3. Further, it is assumed that the original is read by the scanner 3, the read image is edited by the personal computer 1 as being displayed on the display 4, and then the reproduced image is visibly outputted from the printer 3.

Figure 4A:
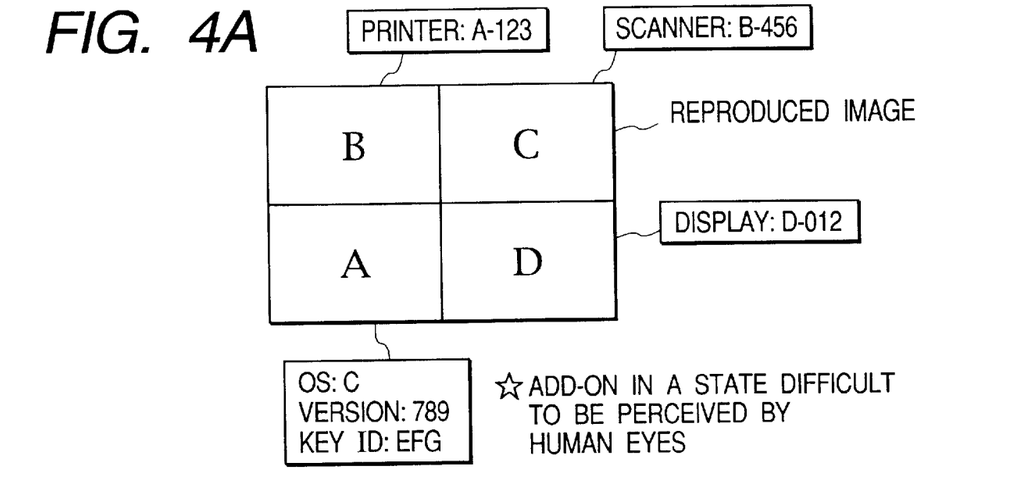
FIGS. 4A, 4B and 4C are views showing a concept of a reproduction image formed in the present embodiment.

When the visible output process is performed, the OS name, the version and the key ID of the personal computer 1 are added on to a lower left area A; the maker name (or product name) and the type of the printer 2 are added on to an upper left area B; the maker name (or product name) and the type of the scanner 3 are added on to an upper right area C; and the maker name (or product name) and the type of the display 4 are added on to a lower right area D, in the state being difficult to be perceived by the human eyes, as shown in the reproduced image of FIG. 4A.

Figure 4B:
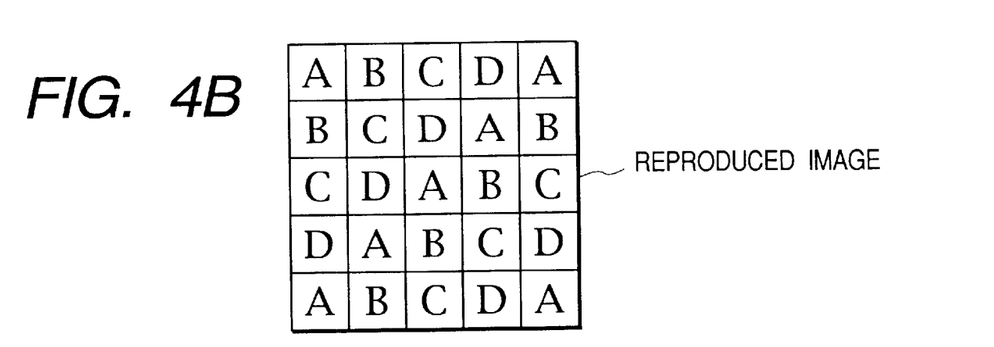

It should be noted that add-on positions are not limited to those shown in FIG. 4A and may be appropriately designed in accordance with necessity. For example, as shown in FIG. 4B, the areas A to D of FIG. 4A may be periodically arranged. Further, when the add-on process is performed without using the display 4 corresponding to the area D, or when such the display 4 does not exist in the image process system, the reproduced image has the area arrangement shown in FIG. 4C.

In the image process system, when the image data or the image represented by the image data is used for some illegal (i.e., prohibited) action, pursuit can be performed on the basis of the additional pattern added on to this image data or this image.

Further, a condition for the add-on process may be changed not only in case of performing the visible output process but also in case of performing the image edit process, the image display process or the like. In the present embodiment, when the image data is visibly outputted to the printer 2, the add-on process is performed in the final step of the image editing. Thus, it can be prevented that the image is edited and changed after the add-on process was performed.

The color profile used in the present embodiment is to correct a color characteristic which is inherent in the device (printer 2, scanner 3, display 4 or the like). Therefore, the color profile corresponds to each device and is generally provided from each device maker.

Figure 6:
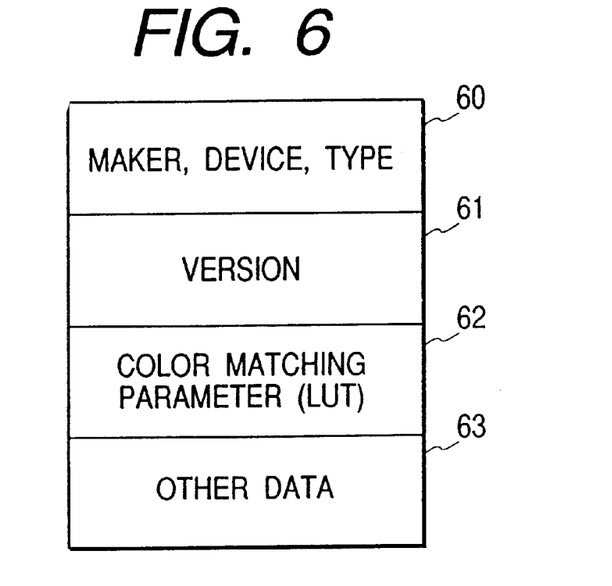
FIG. 6 is a view showing an example of a description form of a color profile.

FIG. 6 is a view showing a data format of above-described color profile.

In FIG. 6, ID information which represents the maker, the device name, the type and the like of the device corresponding to this color profile is described in an area 60, version information of the color profile of this device is described in an area 61, and a look-up table is described in an area 62 as a color matching parameter used in the color correcting.

Further, other data is stored in an area 63. For example, an additional pattern or the like which is used to add on the maker, the device name, the version and the like in the add-on process is described in the area 63.

In a case where the additional pattern is not described, it is necessary for the OS or the various devices themselves to have the function for converting the maker, the device name, the version and the like into the additional pattern.

In the present embodiment, the example is shown in which the ICC-standard color profile is used. However, even in case of a dedicated driver not using the ICC-standard color profile, similarly, the correspondence or matching between the printer driver and the device (i.e., printer) may be confirmed by performing the negotiation between the personal computer 1 (i.e., host computer) and the device. If such the confirmation results no correspondence between the printer driver and the printer, the additional pattern representing "no correspondence between printer driver and printer" shown in FIG. 12 is added to the color image data. Moreover, the discrimination information representing that the printer driver corresponding to which device was used is added on.

As described above, even if the device driver and the device are not corresponding to each other, it is at least possible that the serial number of the OS is added on.

Example of Add-On Process

Hereinafter, one example of the concrete add-on process in the present embodiment will be explained.

It is assumed that the following example is directed to the case where the multivalue data generating (eight-bit data generating on each color=256 gradation generating) is performed because the printer to be used is a multivalue printer in the step S55 of FIG. 5, i.e., the add-on process in the step S56 is performed on the multivalue color image data.

It should be noted that the add-on process is performed on each color component of the color image data (i.e., C (cyan), M (magenta), Y (yellow) and K (black) components converted from R, G and B components in the steps S51 and S52). In the present embodiment, it is assumed that the add-on process is performed only on the Y component, and thus such a case will be explained.

Figure 4C:
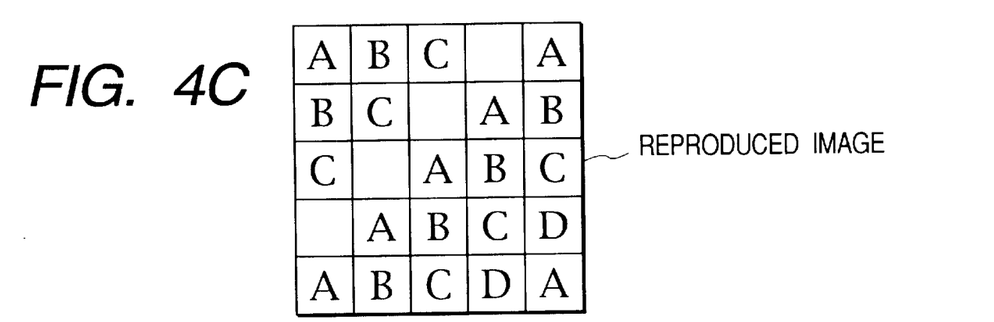

It is further assumed that each of the areas A to D in FIGS. 4A to 4C is considered as a unit image, and the add-on process is performed on this unit image.

Figure 7:
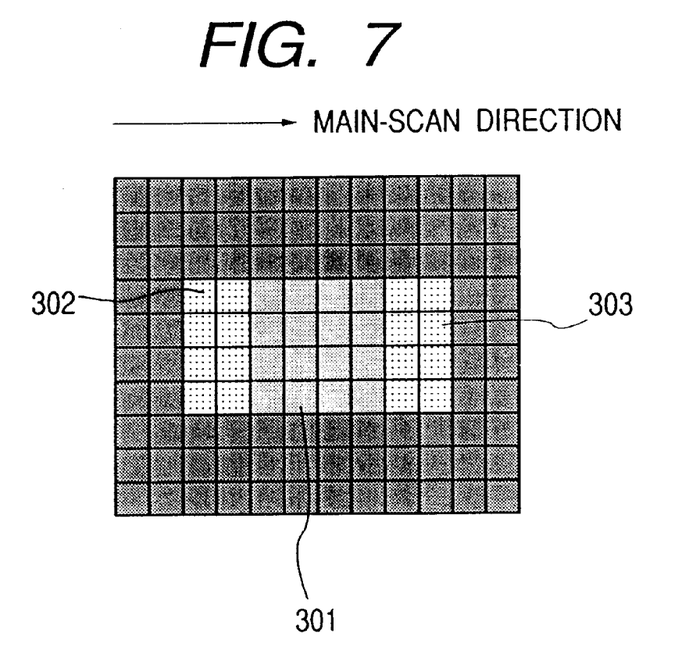
FIG. 7 is a view showing an additional pattern generation method used in an add-on process.

In FIG. 7, 4×4 pixels represented by an area 301 are the part of each of the areas A to D of the multivalue color image data which has been processed until the step S55 by the printer driver in the personal computer 1.

The color image data is modulated such that the gradation of these 4×4 pixels increases by α. Then, in accordance with this, the color image data is modulated such that the gradation of areas 302 and 303 decreases by α. It should be noted that the total number of the pixels of the areas 302 and 303 is the same as that of the area 301. Other areas in FIG. 7 are not modulated. The 8×4 pixels of the areas 301 303 are considered as a unit dot of the additional pattern. According to such the modulation processes, since a density (i.e., gradation) of the image itself does not change, the pattern which is difficult to be perceived by the human eyes can be added on.

Figure 8:
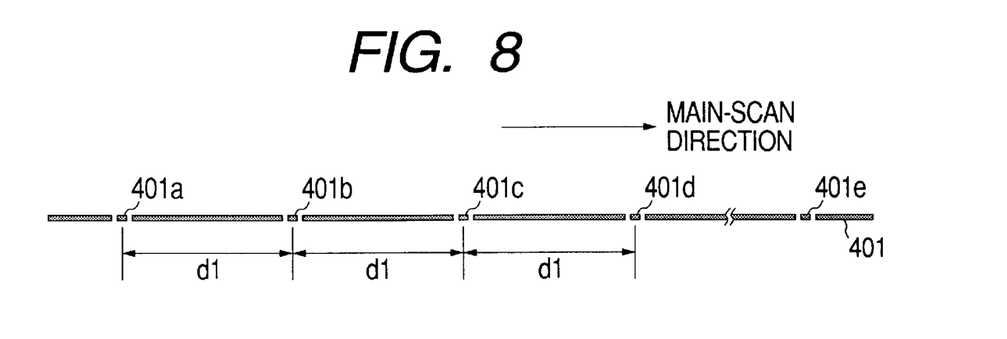
FIG. 8 is a view showing one add-on line existing in each of areas A to D in FIGS. 4A to 4C.
Figure 9:
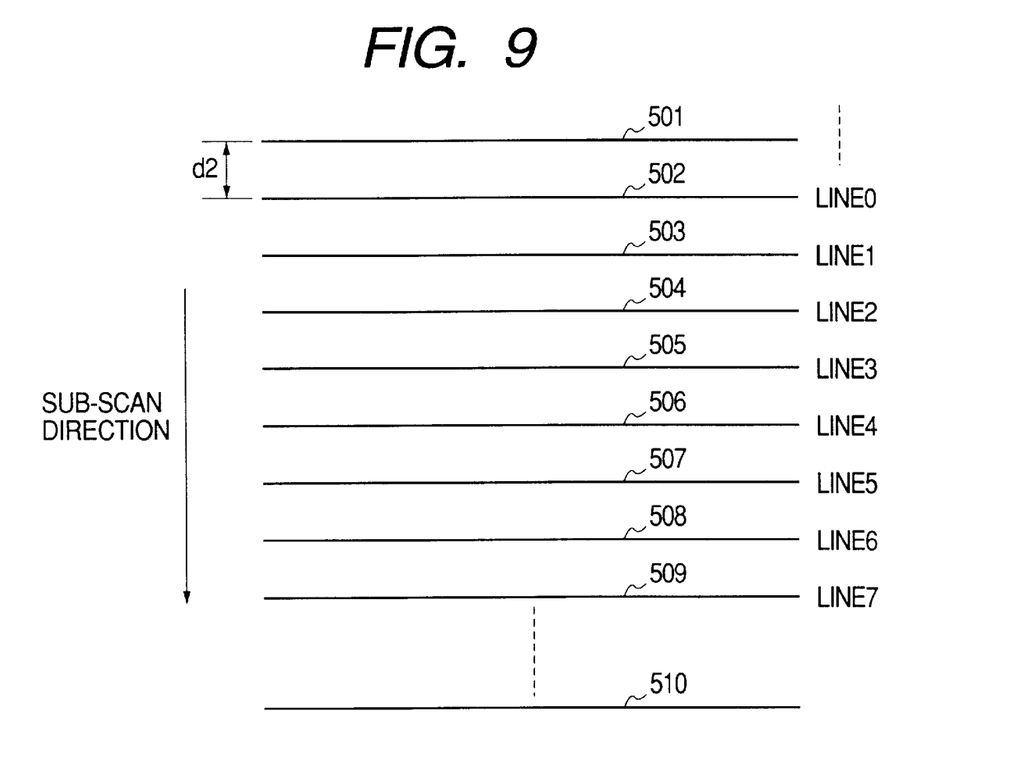
FIG. 9 is a view showing plural add-on lines existing in each of the areas A to D in FIGS. 4A to 4C.

FIGS. 8 and 9 are views showing examples of add-on lines which are provided in the area (each of areas A to D) represented by the color image data.

In FIG. 8, reference numeral 401 denotes the add-on line which has a four-pixel width. Reference numerals 401a to 401e denote the unit dots shown in FIG. 7 each having the 8×4 pixels. The unit dots 401a to 401e are arranged at a predetermined period d1 (e.g., 128 pixels) in the main-scan direction.

Further, in FIG. 9, reference numerals 501 to 510 denote the add-on lines which are arranged at a predetermined period d2 (e.g., 16 pixels) in the subs-can direction. Although the details will be described later, e.g., since one add-on line can represent the four-bit information, the eight add-on lines 502 to 509 (as eight-tuple) can represent the 32-bit additional information. It should be noted that the add-on lines 501 to 509 represent the same information.

Figure 10:
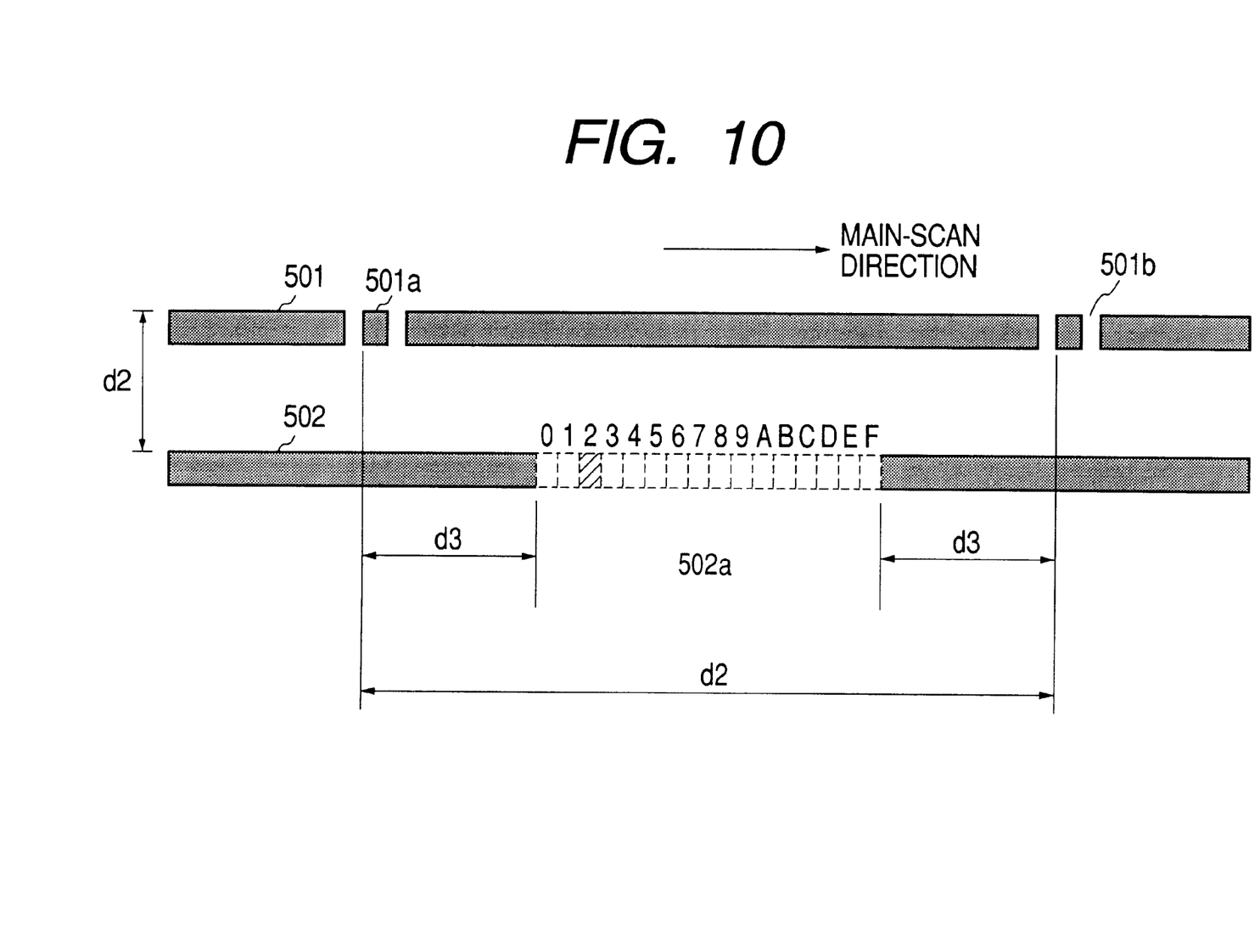
FIG. 10 is a detailed view showing two of the plural add-on lines in FIG. 9.
Figure 11A:
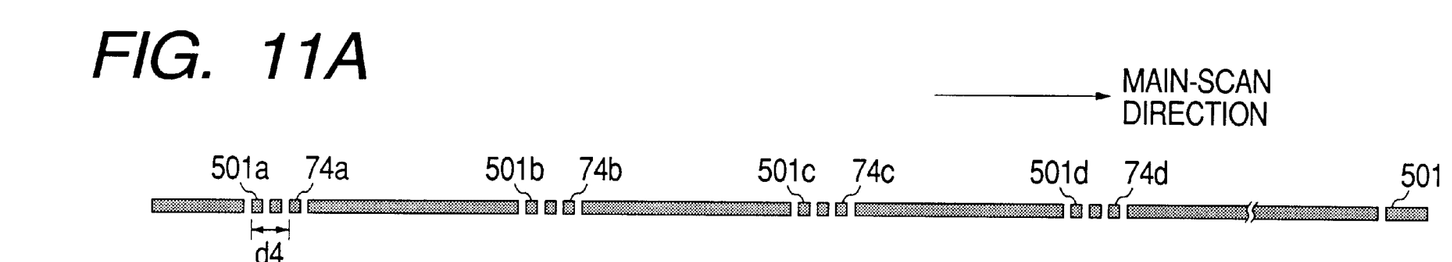
FIGS. 11A and 11B are detailed views showing a case where the two add-on lines in FIG. 10 are actually used.
Figure 11B:
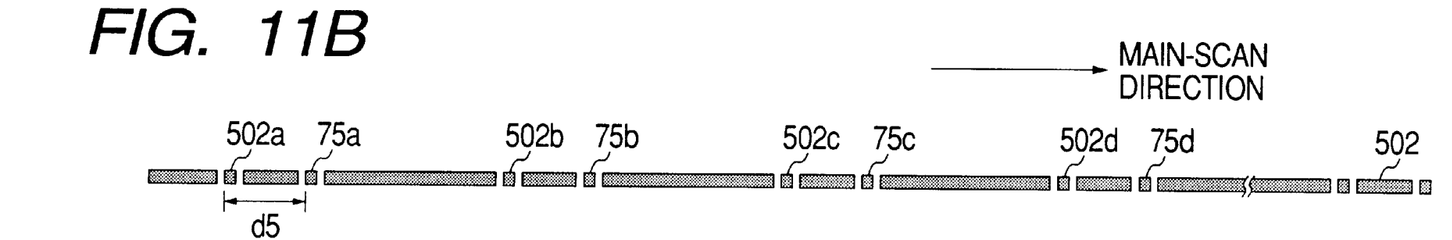

FIG. 10 and FIGS. 11A and 11B are views showing how to express the information (maker and type of scanner 3 and printer 2; product name, version, key ID (serial number) of OS; and the like) by the add-on line.

In FIG. 10, reference numerals 501 and 502 denote the add-on lines shown in FIG. 9. These lines are adjacent to each other in the sub-scan direction. Reference numerals 501a, 501b (in upper add-on line 501) and 502a (in lower add-on line 502) are unit dots. In the upper and lower adjacent lines 501 and 502, each unit dot is apart from others by at least a distance d3 (e.g., 32 pixels) in the main-scan direction, in order to prevent inconvenience that the unit dots in the upper and lower add-on lines 501 and 502 are close to others in the main-scan direction (i.e., upper-line unit dot is arranged in parallel with lower-line unit dot) and thus these dots become remarkable for the human eyes.

The data represented by the unit dot is determined by a phase difference between the unit dots 501a and 502a in the main-scan direction. That is, when the lower-line unit dot 502a is added to a position "2" in positions "0" to "F", such the unit dot 502a represents data "2".

In other words, data "0" to "F" can be expressed by a phase aberration amount in the main-scan direction of the upper and lower adjacent add-on lines.

In FIGS. 11A and 11B, reference numeral 501 and 502 denote the add-on lines shown in FIG. 9. In the add-on line 501, unit dots 74a to 74d are added respectively to the right sides of the unit dots 501a to 501d of the additional patterns which represent the information essentially intended to be added, at a distance d4 (e.g., 16 pixels). Similarly, in the add-on line 502, unit dots 75a to 75d are added respectively to the right sides of unit dots 502a to 502d of the additional patterns which represent the information essentially intended to be added, at a distance d5. Such the additional dot acts as a marker for clarifying that each add-on line is which one from the top. Since the markers are to decide the uppermost and lowermost lines in the sub-scan direction from the visibly outputted image, it is enough to add the markers to the two add-on lines.

Since the above add-on process is performed on the Y component in the Y, M, C and K components, it is difficult for the human eyes to discriminate it.

In the above add-on process, the various information to be added is made as the additional pattern formed by the dots. The add-on process is not limited to this method. That is, an actual character (i.e., maker name or the like) may be added to the Y component of the C, M, Y and K components which form each of the areas A to D of the reproduced image shown in FIGS. 4A to 4C.

Further, it is described in the present embodiment the case where the color image data is visibly outputted by the printer 2. However, the present invention is not limited to this case, and can be applied to suppress or restrain division of the color image data. In such a case, since the various information may not be discriminated from the visibly outputted image, e.g., when the multivalue image data is managed, a bit plane of lower one bit may be replaced by a bit plane in which the various information is represented as the binary image. By such a method, quality of the color image data itself is hardly deteriorated.

The above add-on process is the add-on process to the multivalue image data. However, even in case of performing the add-on process to the binary image data, the add-on process can be performed on the bit plane of the Y component in the known method of, e.g., shifting the dot positions in each line of the image, in the same manner as that for the multivalue image data.

When the personal computer 1 has a network board instead of the modem 5, the personal computer 1 is connected to the network and thus can perform the image data communicating. Further, in the modem 5 or the network board, an inherent number of the modem 5 or the network board can be added to the image represented by the color image data, in the same manner as that for the other apparatus. Therefore, for example, when the color image data inputted from the scanner 3 is transmitted to other external apparatuses through the network, the inherent discrimination information concerning the scanner 3, the personal computer 1 and the network board is surely added to the color image data to be transmitted.

Further, in the present embodiment, in the case where the color image data is transmitted to the other external apparatus through the network, when such the color image data is made to have the file format in which the color profiled can be embedded, the color profile corresponding to the various apparatuses are transferred to the other external apparatus together with the color image data. Therefore, the apparatus which received the color image data can add the inherent discrimination information concerning the scanner 3, the display 4 and the like to the color image data as the additional pattern on the basis of the received color profile.

In the present embodiment, when the color image data to which the color profile was added is outputted to the printer 2, the discrimination information concerning the OS, the printer 2, the scanner 3 and the display 4 is added on to the color image data inputted from the scanner 3. However, in order to prevent the inconvenience that the color image data is unfairly or illegally used before it is outputted to the printer 2, the inherent discrimination information of the scanner 3 stored in the OS or the scanner driver is added to the color image data as the additional pattern as soon as the color image data is inputted from the scanner 3, whereby the discrimination information can be surely added on.

Similarly, for all the apparatuses, the discrimination information of each apparatus is added on as the additional pattern whenever each apparatus processes the color image data, whereby the discrimination information can be surely added on.

In this case, since it is difficult for the printer driver to perform the add-on process, each device driver for operating each device may add on the discrimination information of the OS, the printer 2, the scanner 3 and the display 4.

In another method, the OS of the personal computer 1 may control the add-on process of each device. Moreover, the OS of the personal computer 1 may confirm the connected devices which are usually confirmed by each device driver.

It should be noted that the present invention includes a case where another input apparatus (digital camera, video camera or the like) for inputting the color image data is used instead of the scanner 3. In this case, the information concerning maker and type of such the input apparatus is added on to the area C shown in FIGS. 4A to 4C.

The present invention is not limited to the apparatuses and the methods for realizing the above-described embodiment. That is, the invention employed by a method whereby program codes of a software to realize the functions of the above-described embodiment are supplied to a computer in an apparatus or a system connected to various devices so as to make the devices operative in order to realize the functions of the above-described embodiment and the various devices are operated in accordance with the programs stored in the computer (CPU or MPU) of the system or apparatus is also included in the scope of the present invention.

In such a case, the program codes themselves of the software realize the functions of the above-described embodiment and the program codes themselves and means for supplying the program codes to the computer, e.g., a storage medium in which the program codes have been stored, construct the present invention.

As such the memory medium to store the program codes, e.g., it is possible to use a floppy disk, a hard disk, an optical disk, an optomagnetic disk, a CD-ROM, a magnetic tape, a nonvolatile memory card, a ROM or the like can be used.

It will be obviously understood that the program codes are included in the embodiment of the present invention even in not only a case where the functions of the above-described embodiment are realized by executing the supplied program codes with the computer but also a case where the functions of the above-described embodiment are realized in cooperation with the OS by which the program codes operate in the computer or another application software or the like.

Further, it will be also obviously understood that the present invention also incorporates a case where the supplied program codes are stored into a memory provided in a function expansion board of the computer or a function expansion unit connected to the computer and, after that, the CPU or the like provided in the function expansion board or the function expansion unit executes a part or all of the actual processes on the basis of instructions of the program codes, and the functions of the above-described embodiment are realized by the processes.

According to the above-described embodiments of the present invention, when the image data is managed among the plural image processing apparatuses, it can be suppressed or restrained as much as possible that such the image data is illegally or unfairly used. Further, in addition to the conventional additional information, the further effective additional information can be added in the state difficult to be perceived by the human eyes.

Concretely, when the image data representing the image is outputted to the external apparatus, it can be suppressed that such the image data is illegally or unfairly used. Further, when the image data is inputted from the image pickup apparatus capable of reading the image and generating the image data, it can be suppressed that such the image data is illegally or unfairly used.

Furthermore, on the input image data, the conventional information for identifying the apparatus itself is not added but the another additional information is added, whereby the illegal or unfair use of the image data can be suppressed more effectively.

Although the present invention has been described above with respect to the preferred embodiments, the present invention is not limited to the above-described embodiment but many modifications and variations are possible with the spirit and scope of the appended claims.

What is claimed is:

1. An image processing apparatus which is connectable to an external apparatus being an output destination of image data, said image processing apparatus comprising:

input means for inputting the image data representing an image;

generation means for generating first additional information capable of specifying the external apparatus;

confirmation means for confirming that the first additional information generated by said generation means corresponds to second additional information obtained from the external apparatus;

addition means for adding the first additional information capable of specifying the external apparatus and third additional information capable of specifying said image processing apparatus, to the image data which is input by said input means and output to the external apparatus, in a state that the first and the third additional information are difficult for human eyes to perceive; and output means for outputting the image data to which the first and the third additional information were added by said addition means, to the external apparatus, wherein said addition means repeatedly adds the first additional information capable of specifying the external apparatus and the third additional information capable of specifying said image processing apparatus, each at a predetermined period.

2. An apparatus according to claim 1, wherein the image data is color image data composed of a plurality of color components, and said addition means adds the first and the third additional information not to all of the plurality of color components but to part of the plurality of color components.

3. An apparatus according to claim 2, wherein the part of the color components is a yellow component.

4. An apparatus according to claim 1, wherein said image processing apparatus is further connected to a second external apparatus which is different from the external apparatus and supplies the image data to said input means, and said addition means adds to the image data input by said input means the first additional information capable of specifying the external apparatus and the second external apparatus such that the first additional information is difficult for the human eyes to perceive.

5. An apparatus according to claim 1, wherein said image processing apparatus is further connected to an image display apparatus, and said addition means adds to the image data input by said input means the third additional information capable of specifying the image display apparatus such that the third additional information is difficult for the human eyes to perceive.

6. An apparatus according to claim 1, further comprising discrimination means for discriminating a feature of the external apparatus, and wherein said addition means adds the first additional information on the basis of a discriminated result by said discriminating means.

7. An apparatus according to claim 6, wherein when said discrimination means can not discriminate the feature of the external apparatus, said addition means adds the first additional information representing that the discriminating of the external apparatus is impossible.

8. An apparatus according to claim 6, wherein said discrimination means performs the discriminating on the basis of a result of negotiation between the external apparatus and said image processing apparatus.

9. An apparatus according to claim 1, wherein said image processing apparatus includes a personal computer.

10. An apparatus according to claim 1, wherein the external apparatus includes an image formation apparatus which prints and outputs the image.

11. An apparatus according to claim 4, wherein the second external apparatus is an image read apparatus which generates the image data by reading an original.

12. An apparatus according to claim 1, wherein the second additional information capable of specifying said image processing apparatus is information concerning an OS (operating system).

13. An apparatus according to claim 11, wherein the second additional information for specifying said image processing apparatus is information concerning an OS (operating system).

14. A control method of an image processing apparatus which is connected to an external apparatus being an output destination of image data, said method comprising:

an input step of inputting the image data representing an image;

a generating step of generating first additional information capable of specifying the external apparatus;

confirmation means for confirming that the first additional information generated by said generation means corresponds to second additional information obtained from the external apparatus;

an addition step of adding the first additional information capable of specifying the external apparatus and third additional information capable of specifying the image processing apparatus, to the image data which is input in said input step and is output to the external apparatus, in a state that the first and the third additional information is difficult for human eyes to perceive; and an output step of outputting the image data to which the first and the third additional information were added in said addition step, to the external apparatus, wherein said addition step comprises repeatedly adding the first additional information capable of specifying the external apparatus and the third additional information capable of specifying the image processing apparatus, each at a predetermined period.

15. A storage medium which stores, in a computer readable state, a control program of an image processing apparatus connected to an external apparatus being an output destination of image data, said control program comprising:

an input step of inputting the image data representing an image;

a generating step of generating first additional information capable of specifying the external apparatus;

confirmation means for confirming that the first additional information generated by said generation means corresponds to second additional information obtained from the external apparatus;

an addition step of adding the first additional information capable of specifying the external apparatus and third additional information capable of specifying the image processing apparatus, to the image data which is input in said input step and is output to the external apparatus, in a state that the first and the third additional information are difficult for human eyes to perceive; and an output step of outputting the image data to which the first and the third additional information was added in said addition step, to the external apparatus, wherein said addition step comprises repeatedly adding the first additional information capable of specifying the external apparatus and the third additional information capable of specifying the image processing apparatus, each at a predetermined period.

16. An image processing apparatus which is connectable to an external image pickup apparatus for generating image data by reading an image, said image processing apparatus comprising:

input means for inputting the image data from the image pickup apparatus;

generation means for generating first additional information capable of specifying the external image pickup apparatus;

confirmation means for confirming that the first additional information generated by said generation means corresponds to second additional information obtained from the external apparatus;

addition means for adding the first additional information capable of specifying the external image pickup apparatus and third additional information for specifying said image processing apparatus, to the image data input by said input means, in a state that the first and the third additional information are difficult for human eyes to perceive; and output means for outputting the image data to which the first and the third additional information were added by said addition means, wherein said addition means repeatedly adds the first additional information capable of specifying the external apparatus and the third additional information capable of specifying said image processing apparatus, each at a predetermined period.

17. An apparatus according to claim 16, wherein the image data is color image data composed of a plurality of color components, and said addition means adds the first and the third additional information not to all of the plurality of color components but to the part of the color components.

18. An apparatus according to claim 17, wherein the part of the color components is a yellow component.

19. A control method of an image processing apparatus which is connected to an external image pickup apparatus for generating image data by reading an image, said method comprising:

an input step of inputting the image data from the image pickup apparatus;

a generating step of generating first additional information capable of specifying the external image pickup apparatus;

confirmation means for confirming that the first additional information generated by said generation means corresponds to second additional information obtained from the external apparatus;

an addition step of adding the first additional information capable of specifying the external image pickup apparatus and third additional information for specifying the image processing apparatus, to the image data input in said input step, in a state that the first and the third additional information are difficult for human eyes to perceive; and an output step of outputting the image data to which the first and the third additional information were added in said addition step, wherein said addition step comprises repeatedly adding the first additional information capable of specifying the external apparatus and the third additional information capable of specifying the image processing apparatus, each at a predetermined period.

20. A storage medium which stores, in a computer readable state, a control program of an image processing apparatus which is connected to an external image pickup apparatus for generating image data by reading an image, said control program comprising:

an input step of inputting the image data from the image pickup apparatus;

a generating step of generating first additional information capable of specifying the external image pickup apparatus;

confirmation means for confirming that the first additional information generated by said generation means corresponds to second additional information obtained from the external apparatus;

an addition step of adding the first additional information capable of specifying the external image pickup apparatus and third additional information for specifying the image processing apparatus, to the image data input in said input step, in a state that the first and the third additional information are difficult for human eyes to perceive; and an output step of outputting the image data to which the first and the third additional information were added in said addition step, wherein said addition step comprises repeatedly adding the first additional information capable of specifying the external apparatus and the third additional information capable of specifying the image processing apparatus, each at a predetermined period.

21. An image processing apparatus which is connectable to an external apparatus, said image processing apparatus comprising:

input means for inputting image data;

color process means for performing a color process on the image data input by said input means, in a method suitable for the external apparatus;

generation means for generating first additional information capable of specifying the external apparatus and the method of the color process;

confirmation means for confirming that the first additional information generated by said generation means corresponds to second additional information obtained from the external apparatus;

addition means for adding the first additional information capable of specifying the external apparatus and the method of the color process and third additional information capable of specifying said image processing apparatus, to the image data, in a state that the first and the third additional information are difficult for human eyes to perceive; and output means for outputting the image data to which the first and the third additional information were added by said addition means, wherein said addition means repeatedly adds the first additional information capable of specifying the external apparatus and the method of the color process and the second additional information capable of specifying the image processing apparatus, each at a predetermined period.

22. An apparatus according to claim 21, wherein the code represents information which can specify a color profile used in the color process.

23. An apparatus according to claim 21, wherein the code represents information which can specify the external apparatus.

24. An apparatus according to claim 21, wherein the second additional information capable of specifying said image processing apparatus is information concerning an OS (operating system).

25. A control method of an image processing apparatus which is connectable to an external apparatus, said method comprising:

an input step of inputting image data;

a color process step of performing a color process on the image data input in said input step, in a method suitable for the external apparatus;

a generation step of generating first additional information capable of specifying the external apparatus and the method of the color process;

confirmation means for confirming that the first additional information generated by said generation means corresponds to second additional information obtained from the external apparatus;

an addition step of adding the first additional information capable of specifying the external apparatus and the method of the color process and third additional information capable of specifying the image processing apparatus, to the image data, in a state that the additional information is difficult for human eyes to perceive; and an output step of outputting the image data to which the first and the third additional information were added in said addition step, wherein said addition step comprises repeatedly adding the first additional information capable of specifying the external apparatus and the method of the color process and the third additional information capable of specifying the image processing apparatus, each at a predetermined period.

26. A storage medium which stores, in a computer readable state, a control program of an image processing apparatus which is connectable to an external apparatus, said control program comprising:

an input step of inputting image data;

a color process step of performing a color process on the image data input in said input step, in a method suitable for the external apparatus;

a generation step of generating first additional information capable of specifying the external apparatus and the method of the color process;

confirmation means for confirming that the first additional information generated by said generation means corresponds to second additional information obtained from the external apparatus;

an addition step of adding the first additional information capable of specifying the external apparatus and the method of the color process and third additional information capable of specifying the image processing apparatus, to the image data, in a state that the first and the third additional information are difficult for human eyes to perceive; and an output step of outputting the image data to which the first and the third additional information were added in said addition step, wherein said addition step comprises repeatedly adding the first additional information capable of specifying the external apparatus and the method of the color process and the third additional information capable of specifying the image processing apparatus, each at a predetermined period.

27. An image processing apparatus which is connected to plural apparatuses, comprising:

input means for inputting an image;

generation means for generating first additional information to specify, in the plural connected apparatuses, each of the plural apparatuses concerning the input image;

confirmation means for confirming that the first additional information generated by said generation means corresponds to second additional information obtained from the external apparatus;

addition means for adding the first and third additional information in a state that the first and the third additional information is difficult for human eyes to perceive; and output means for outputting the added first and the third additional information, wherein said addition means repeatedly adds the first additional information capable of specifying each of the plural apparatuses concerning the input image, each at a predetermined period.

28. A control method of an image processing apparatus which is connected to plural apparatuses, said method comprising the steps of:

inputting an image;

generating first additional information to specify, in the plural connected apparatuses, each of the plural apparatuses concerning the input image;

confirmation means for confirming that the first additional information generated by said generation means corresponds to second additional information obtained from the external apparatus;

adding the first and third additional information in a state that the first and the third additional information is difficult for human eyes to perceive; and outputting the added first and the third additional information, wherein said adding step comprises repeatedly adding the first additional information capable of specifying each of the plural apparatuses concerning the input image, each at a predetermined period.

29. A storage medium which stores, in a computer readable state, a control program of an image processing apparatus connected to plural apparatuses, said control program comprising codes to perform the steps of:

inputting an image;

generating first additional information to specify, in the plural connected apparatuses, each of the plural apparatuses concerning the input image;

confirmation means for confirming that the first additional information generated by said generation means corresponds to second additional information obtained from the external apparatus;

adding the first and third additional information in a state that the first and the third additional information is difficult for human eyes to perceive; and outputting the added first and the third additional information, wherein said adding step comprises repeatedly adding the first additional information capable of specifying each of the plural apparatuses concerning the input image, each at a predetermined period.

* * * * *

UNITED STATES PATENT AND TRADEMARK OFFICE
CERTIFICATE OF CORRECTION

PATENT NO.    : 6,546,129 B1
DATED         : April 8, 2003
INVENTOR(S)   : Takatoshi Ohta et al.

It is certified that error appears in the above-identified patent and that said Letters Patent is hereby corrected as shown below:

Column 1,
Line 63, "object of" should read -- object --.

Column 2,
Line 66, "further another" should read -- further --.

Column 4,
Line 33, "an" should read -- a --.

Column 5,
Lines 16 and 17, "embeded" should read -- embedded --.

Column 8,
Line 48, "subs-can" should read -- sub-scan --.

Column 14,
Lines 9 and 10, "the part" should read -- part --.

Column 15,
Lines 21 and 61, "apparatus," should read -- apparatus --.

Column 16,
Line 26, "apparatus," should read -- apparatus --.

Signed and Sealed this

Sixteenth Day of December, 2003

JAMES E. ROGAN
*Director of the United States Patent and Trademark Office*